(12) United States Patent
Leboisne et al.

(10) Patent No.: US 6,976,417 B2
(45) Date of Patent: Dec. 20, 2005

(54) PNEUMATIC BRAKE BOOSTER WITH LOW OPERATING NOISE

(75) Inventors: Cédric Leboisne, Paris (FR); Teddy Rossi, Morangis (FR); Christian Rocher, Ermont (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/832,018

(22) Filed: Apr. 26, 2004

(65) Prior Publication Data
US 2004/0206230 A1 Oct. 21, 2004

(51) Int. Cl.$^7$ .............................................. F15B 9/10
(52) U.S. Cl. ................................................... 91/369.2
(58) Field of Search ........................... 91/369.2, 376 R

(56) References Cited

U.S. PATENT DOCUMENTS 5,711,203 A * 1/1998 Gautier et al. ............ 91/376 R

* cited by examiner

Primary Examiner—Thomas E. Lazo
(74) Attorney, Agent, or Firm—Leo H McCormick, Jr.; Warren Comstock

(57) ABSTRACT

The subject of the present invention is a pneumatic brake booster comprising an envelope in which a skirt (2) slides in a sealed manner, a pneumatic piston (8) rigidly attached to the skirt, a three-way valve (20) actuated by a control rod (22) operated at a first end by a pedal, a plunger (32) mounted at a second longitudinal end which is the opposite end and slideably mounted in the body of the piston, the control rod and the plunger forming a brake control (33), characterized in that the said booster comprises means (68) of damping the relative and in particular oscillatory movement between the brake control (33) and the pneumatic piston (8).

18 Claims, 7 Drawing Sheets

PNEUMATIC BRAKE BOOSTER WITH LOW OPERATING NOISE

The present invention relates to a pneumatic brake booster with low operating noise.

Known pneumatic brake boosters are disposed between a brake pedal and a master cylinder and transmit to the master cylinder the amplified force applied to the pedal by the driver.

The booster comprises a sealed pneumatic envelope of longitudinal axis, a skirt mounted sealed and slidable in the envelope, a pneumatic piston mounted rigidly in a central orifice of the skirt and rigidly secured to the skirt in movement, a low pressure chamber or front chamber and a variable pressure chamber or rear chamber which chambers are delimited by the skirt and the envelope, a three-way valve mounted in a piston shank and controlled by a control rod and suitable for placing the low pressure chamber in communication with the variable pressure chamber or for isolating in sealed manner the front chamber from the rear chamber and for supplying the rear chamber with pneumatic fluid at high pressure, for example air at atmospheric pressure.

The control rod comprises a first longitudinal rear end connected to a brake pedal and a second end at the opposite end from the first end and mounted in rolling manner in a plunger slidably mounted in the pneumatic piston.

The three-way valve comprises a first equalizing valve suitable for placing in communication or isolating the front chamber and the rear chamber one seat of which is supported by the piston and a second inlet valve for supplying the rear chamber with air at atmospheric pressure, one valve seat of which is supported by a rear end of the plunger.

The blanking elements of the first and second valves are formed by an elastomer membrane bearing against one or other or both of the first and second seats depending on the actuation of the control rod. A spring strengthens the pressure of the membrane on the valve seat or seats.

A thrust rod coaxial with the control rod is placed between the second end of the sensor and a piston of the master cylinder and transmits via one front longitudinal end pressing against a hydraulic piston of the master cylinder the braking force applied by the driver and the boost force supplied by the booster. A reaction disk in substantially incompressible material is placed at a rear end of the thrust rod and receives via a rear face the forces applied by the driver and by the pneumatic piston and via a front face the reaction of the master cylinder, and transmits a portion of the reaction of the master cylinder to the control rod via the plunger thereby enabling the driver to manage the braking.

At rest, a clearance is provided between the reaction disk and the plunger, determining the jump phase well known to those skilled in the art.

Occasionally a noise has been noticed; this is called "wiper noise" because it is similar to the noise of a windshield wiper on a dry windshield. This noise may occur before the master cylinder impresses a hydraulic reaction on the reaction disk via the thrust rod when there is a rapid movement of the control rod with a light force. This noise is due to a phase of instability of the three-way valve.

A booster normally operates as follows. When the driver presses on the brake pedal, the control rod is moved axially and carries the plunger toward the thrust rod.

The movement of the plunger toward the thrust rod closes the equalizing valve, isolating the front chamber from the rear chamber and opens the inlet valve allowing the air at atmospheric pressure to enter the rear chamber. A pressure difference then occurs between the front chamber and the rear chamber, causing the pneumatic movement toward the thrust rod. The thrust rod is then moved, carrying with it at least one piston of the master cylinder. The pressure then increases in the hydraulic braking circuit and this is passed on by means of the thrust rod to the reaction disk. The reaction disk then combines the forces applied by the thrust rod, the pneumatic piston and the plunger. A reaction is then transmitted back to the driver via the control rod so that the driver can then manage the degree of braking. Sometimes however, it may happen, for a determined speed of movement of the control rod and a determined force applied to the control rod, that the pneumatic piston, after closure of the equalizing valve and opening of the inlet valve, moves axially toward the thrust rod with sufficient speed to cause the equalizing valve to reopen and the inlet valve to close. The pneumatic piston is then repulsed axially toward the pedal causing the closure of the equalizing valve and the opening of the inlet valve. This sequence of opening/closing of the valves occurs several times until a reaction appears in the master cylinder and the reaction disk deforms.

The opening/closing sequences then cause the "wiper noise". The noise in no way indicates a malfunction of the booster but may however lead the driver to believe that the braking system is damaged. Consequently, it must be silenced or reduced so that it is no longer audible to the driver.

Document FR 00/06715 proposes a permanent contact between the plunger and the reaction disk and the provision of a clearance for the jump between the front face of the reaction disk and the thrust rod. This solution is very effective in the majority of cases but is insufficient for certain vehicles.

In addition, for reasons of bulk and cost it is not an option to increase the sound insulation of the vehicle and of the booster.

Consequently one object of the present invention is to offer a booster that is quiet in all braking situations.

It is also an object of the present invention to offer a booster of simple design.

It is also an object of the present invention to offer a booster costing little to produce.

The aforementioned objects are achieved with a booster comprising an envelope in which a skirt slides in a sealed manner, a piston secured to the skirt, a three-way valve actuated by a control rod operated at a first end by a pedal, a plunger mounted at a second, opposite, longitudinal end and slidably mounted in the piston body, the relative movement of the control rod—plunger assembly and of the pneumatic piston being limited at least in a first braking phase.

In other words, the booster comprises means of reducing the amplitude of the movements between the control assembly and the piston.

The principal subject of the present invention is a pneumatic brake booster comprising an envelope of longitudinal axis, a first, low pressure, chamber, a second, variable pressure, chamber, a skirt delimiting the first and second chambers and mounted sealed and slidable in the envelope, a pneumatic piston rigidly attached to a central portion of the skirt, a three-way valve mounted in a shank of the pneumatic piston and actuated by a brake control comprising a control rod of longitudinal axis operated by a pedal at a first longitudinal end, a plunger mounted in ball-joint fashion at a second longitudinal end of the said control rod, the said three-way valve comprising an equalizing valve suitable for interconnecting the first and second chambers at rest and an inlet valve suitable for allowing the second chamber to be supplied with pneumatic fluid at high pressure, the equalizing valve comprising a first seat supported by the body of the piston and a blanking element, the inlet valve comprising a second seat supported by a first longitudinal end of the plunger and the said blanking element, the plunger comprises at a second longitudinal end, the opposite end to the first end, a surface facing a first face of a reaction disk bearing via a second face on a first longitudinal end of a thrust rod suitable for transmitting a braking force applied to the brake control and the brake boosting effect to a master-cylinder, the pneumatic piston also comprising in its central portion a surface bearing against the first face of the reaction disk, characterized in that the said booster comprises means of damping the relative and in particular oscillatory movement between the brake control and the pneumatic piston.

The subject of the present invention is also a pneumatic brake booster characterized in that the said damping means make a friction coupling between the brake control and the pneumatic piston.

The subject of the present invention is also a pneumatic brake booster characterized in that the said damping means are interposed between the plunger and the piston.

The subject of the present invention is also a pneumatic brake booster characterized in that the said damping means comprise an annular groove made in an external wall of a first cylindrical portion of the plunger close to the control rod and an element in a material with a high coefficient of friction mounted in the said groove and intended to come into contact with a first cylindrical section of the passage of the piston.

The subject of the present invention is also a pneumatic brake booster characterized in that the said damping means comprise an annular groove made in an inner wall of a first cylindrical section of the passage of the piston and an element in a material with a high coefficient of friction mounted in the said groove and intended to come into contact with a first cylindrical portion of the plunger close to the control rod.

The subject of the present invention is also a pneumatic brake booster characterized in that the said damping means comprise an annular groove made in an outer wall of a second cylindrical portion of the plunger close to the reaction disk and an element in a material with a high coefficient of friction mounted in the said groove and intended to come into contact with a second cylindrical section of the passage of the piston.

The subject of the present invention is also a pneumatic brake booster characterized in that the said element is made of elastomer.

The subject of the present invention is also a pneumatic brake booster characterized in that the said element is an O-ring.

The subject of the present invention is also a pneumatic brake booster characterized in that the friction forces between the piston and the brake control lie advantageously between 5 Newtons and 40 Newtons.

The subject of the present invention is also a pneumatic brake booster characterized in that the friction forces between the piston and the brake control lie more advantageously between 5 Newtons and 20 Newtons.

The subject of the present invention is also a pneumatic brake booster characterized in that the friction forces between the piston and the brake control lie yet more advantageously between 10 Newtons and 20 Newtons.

The subject of the present invention is also a pneumatic brake booster characterized in that the said damping means connect via a first end a stationary element of the piston forming the bearing surface via a first face of one end of a return spring of the control rod and via a second face of one end of a valve spring and via a second end a rear face of the blanking element.

The subject of the present invention is also a pneumatic brake booster characterized in that the said damping means connect via a first end a stationary element of the piston forming a bearing surface via a first face of one end of a return spring of the control rod and via a second face of an end of a valve spring, and via a second end the control rod.

The subject of the present invention is also a pneumatic brake booster characterized in that the said damping means are of the magnetic type.

The subject of the present invention is also a pneumatic brake booster characterized in that a first magnet and a second magnet are mounted respectively on the brake control and on the pneumatic piston so that their opposite poles are facing each other or at least partially facing each other.

The subject of the present invention is also a pneumatic brake booster characterized in that at least one of the said magnets is an electromagnet and in that provision is made to stop the power supply to the said electromagnet when the risks of disruptive oscillatory relative movements between the piston and the plunger have disappeared.

The subject of the present invention is also a pneumatic brake booster characterized in that the said damping means are of the electrostatic type.

The subject of the present invention is also a pneumatic brake booster characterized in that the piston and the brake control are at least locally charged with opposite electrostatic charges.

The present invention will be better understood using the description that follows and the appended figures in which the front and rear correspond respectively to the left and right of the drawings and in which.

The same references are used to describe the elements that have the same function and the same structure throughout the description.

All the elements described have geometry of revolution about a longitudinal axis X, and, if this is not the case, this is described.

Figure 1:
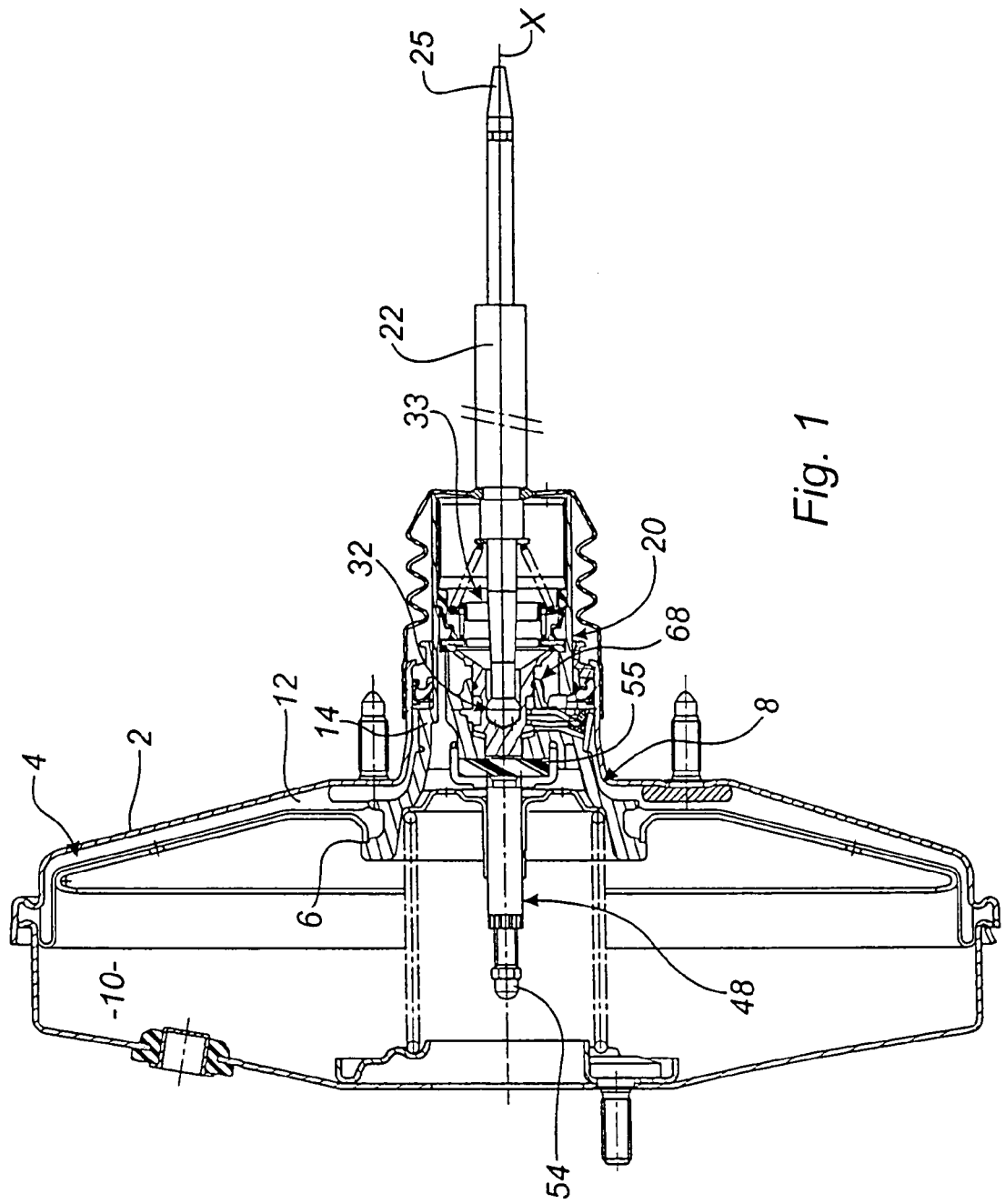
FIG. 1 is a view in longitudinal section of a first example of a first embodiment of a pneumatic booster according to the present invention.
Figure 2:
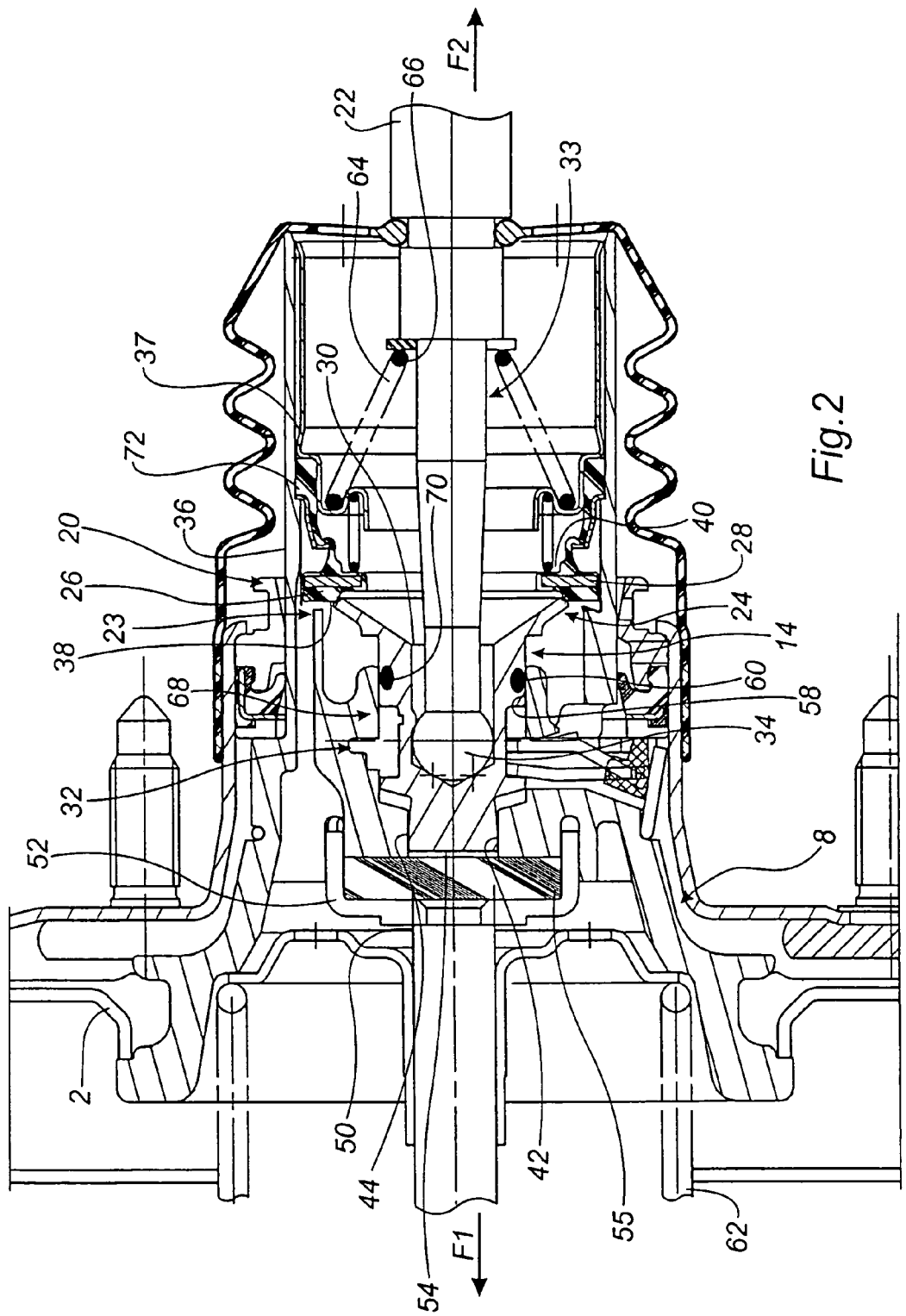
FIG. 2 is a detailed view of FIG. 1.

FIGS. 1 and 2 show a first example of a first embodiment of a booster according to the present invention of longitudinal axis X comprising an envelope 2 defining a sealed volume in which slidingly mounted is a skirt 4 furnished with a central orifice 6 in which is mounted in a sealed manner a pneumatic piston 8. The skirt divides the sealed volume into a first, front, low pressure, chamber 10 and a second, rear, variable pressure, chamber 12. The first chamber 10 is supplied for example with pneumatic fluid at low pressure by a vacuum pump or an engine air intake.

The pneumatic piston 8 is formed of a body 14 of substantially frustoconical shape facing rearward, the base of the cone frustum being secured in the central orifice 6 of the skirt 4. The body 14 also comprises a substantially cylindrical shank extending rearward.

The piston body 14 is drilled with an axial through passage 18 in which is mounted a three-way valve 20 actuated by a control rod 22 connected at a first longitudinal end 25 to a brake pedal (not shown).

The three-way valve 20 comprises a first equalizing valve 23 which, at rest, places the front chamber 10 in communication with the rear chamber 12, and, a second valve 24 for letting air at atmospheric pressure into the rear chamber during the braking phase.

The first valve 23 and the second valve 24 comprise respectively first and second seats 26, 28 supported respectively by the piston body 14 and by a first rear longitudinal end 30 of a plunger 32 mounted at a second axial end 34 of the control rod 22.

The rear end 30 of the plunger 32 receives in ball-joint fashion the front end 34 of the control rod and extends rearward via a forward facing frustoconical flare.

The plunger 32 and control rod 22 assembly forms a brake control 33.

Each valve 22, 24 also comprises a blanking element 36 secured to the piston body comprising an annular plate 38 suitable for bearing against the first seat 26 or the second seat 28 or both seats 26, 28 simultaneously in a position of equilibrium. A cylindrical spring 35 strengthening the pressure of the blanking element 36 on the first and/or second seats 26, 28 is mounted in reaction against a stationary element 37 of the piston body and a rear face 40 of the blanking plate 38.

The plunger 32 is slidingly mounted in a front portion of lesser diameter of the passage 18 through the piston body 18.

The booster also comprises a thrust rod 48 coaxial with the control rod 22 and mounted between the plunger and a master cylinder (not shown). The thrust rod 48 comprises, at a first rear longitudinal end 50, a cup-shaped housing 52 receiving a reaction disk 55 facing a second front longitudinal end 54 of the plunger 32, called the sensor and a front end 56 of the pneumatic piston.

The thrust rod 48 transmits to the master cylinder the forces applied to the control rod 22 and via the pneumatic piston operated by the skirt 4.

The reaction disk 55 is made of substantially incompressible material and combines the forces supplied by the control rod, by the pneumatic piston and by the thrust rod transmitting the reaction of the master cylinder.

The plunger 32 comprises at least one first cylindrical portion 44 suitable for being mounted with a minimum clearance to avoid becoming jammed in a first cylindrical section 42 of the front portion of the passage 18 providing the guidance of the plunger in the piston body, the first cylindrical portion 44 supporting the sensor 54. In the example shown, the plunger also comprises a second cylindrical portion 58 ahead of the frustoconical flare and of greater diameter than the diameter of the first cylindrical portion 44 and also mounted with a minimum clearance in a second cylindrical section 60 of the passage 18 of the piston body 14.

The booster also comprises a first return spring 62 returning the piston to the rest position and mounted in compression between the piston and an inner face of the envelope 2, and a second return spring 64 returning the control rod and mounted in compression between an annular surface 66 projecting from the surface of the control rod 22 and the fixed element 37 of the piston.

The booster according to the present invention also comprises means 68 of damping the relative and in particular oscillatory movement between the brake control 33 and the pneumatic piston 8. In the particular example shown in FIGS. 1 and 2, the means 68 form a friction coupling between the plunger 32 and the piston 8 to reduce the amplitude of the oscillating movements of the piston relative to the plunger 32. In the example shown, the means 68 comprise an annular element 72 in a material with a high coefficient of friction, mounted in an annular groove 70 made on the outer surface of the second cylindrical portion 58 of the plunger 32. The dimensions of the seal 72 and of the groove 70 are determined in such a way as to provide a sufficient friction force between the surface of the seal 72 and the second cylindrical section 60 of the passage 18 to sufficiently attenuate the oscillatory movements between the piston and the sensor and avoid or at least reduce the "wiper noise".

The annular element is for example made of elastomer, for example rubber.

The annular element is advantageously an O-ring which is low cost, easy to install and durable.

The presence of these friction forces between the plunger and the piston limits the relative movement of the piston and the plunger in a first axial direction indicated by the arrow F1 and in a second direction indicated by the arrow F2, thus reducing the risk of the occurrence of "wiper noise". Thus, when the driver presses on the brake pedal in determined conditions of speed and force of application, the equalizing valve closes, the inlet valve opens, the pneumatic piston moves axially toward the thrust rod. In the absence of reaction from the master cylinder at the very beginning of the braking phase, the piston tends to move rapidly; However, because of the friction between the plunger 32 and the piston 8, the amplitude of the movement of the piston 8 in the direction F1 is reduced as is its movement in the direction F2. In consequence, the oscillatory movement between the plunger and the piston is greatly reduced.

Figure 3:
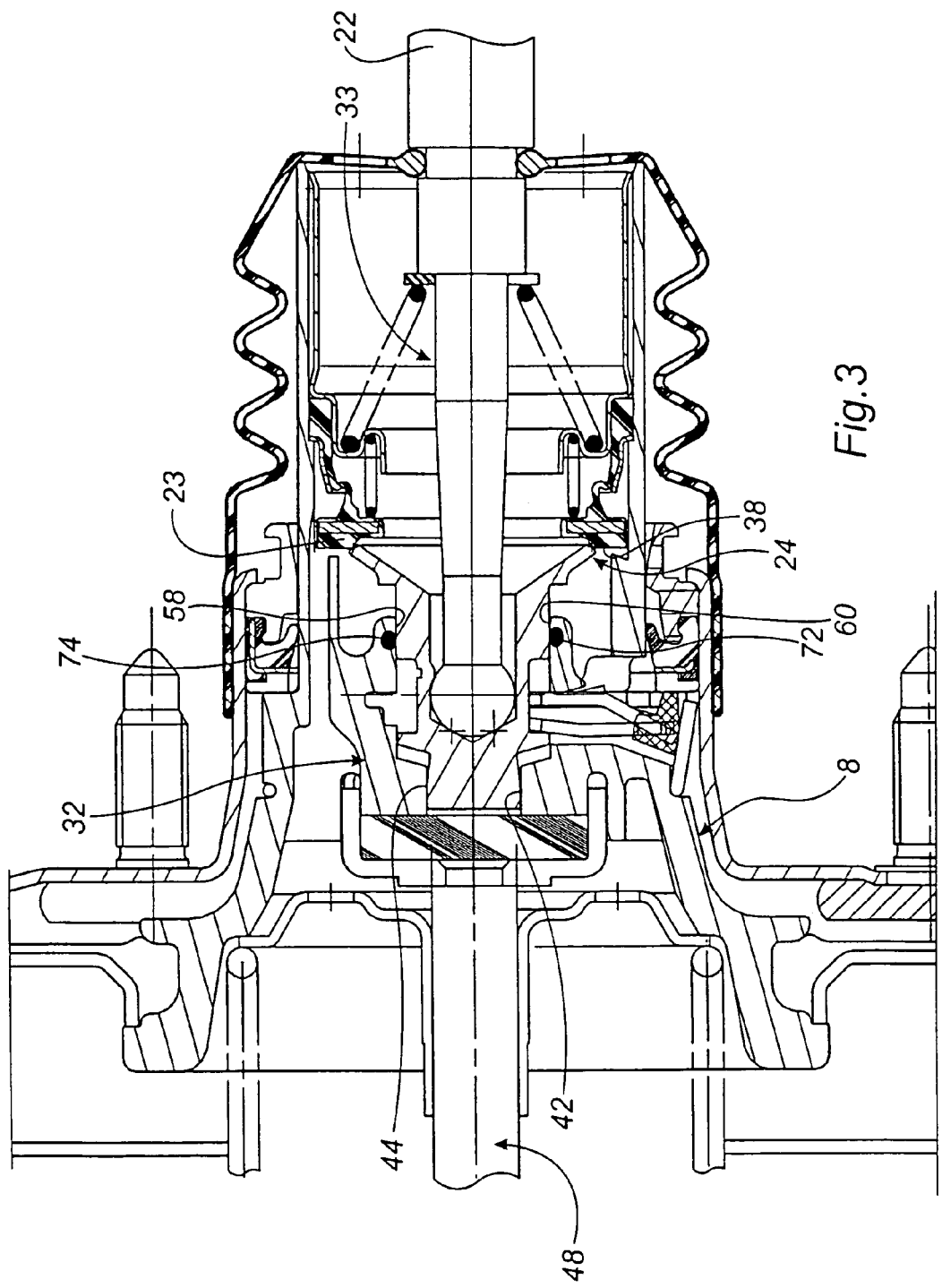
FIG. 3 is a view in longitudinal section of a detail of a second example of the first embodiment according to the present invention.

FIG. 3 shows a second example of the first embodiment in which the means of damping the relative movement between the plunger and the pneumatic piston are supported by the piston 8. The piston 8 comprises a groove 74 made in the inner surface of the second cylindrical section 60 of the passage 18 in which an O-ring 72 is mounted and in contact with the second cylindrical portion 58.

Figure 4:
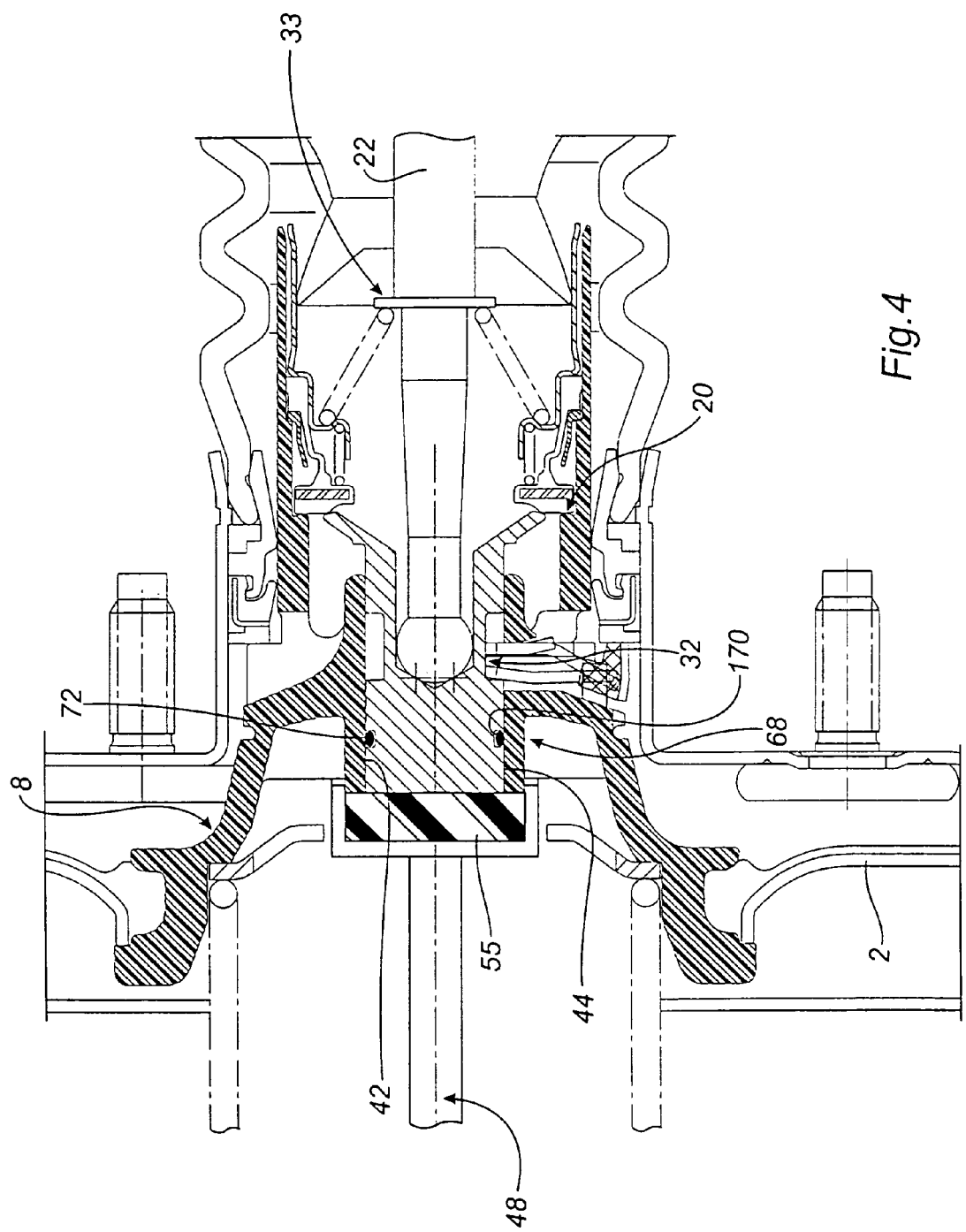
FIG. 4 is a view in longitudinal section of a detail of a third example of the first embodiment according to the present invention.

FIG. 4 shows a third example of the first embodiment in which the O-ring is mounted in a groove 170 made in the first cylindrical portion 44 of the plunger, the ring then coming into contact with the inner surface of the first cylindrical section 42.

For the booster shown in FIGS. 1 to 4, the frequency of vibration of the piston 8 relative to the sensor 32 is typically of the order of 50 Hz. The friction forces that are necessary for this frequency of vibration between the plunger 32 and the piston 8 are advantageously between 5 and 40 Newtons, preferably between 5 and 20 Newtons and even more preferably between 10 and 20 Newtons.

The provision of a groove made in the inner surface of the first cylindrical section 42 to receive the ring 72 may also be envisaged.

It is well understood that any other type of clover leaf seal or lip seal may be provided, and it is feasible to provide for the disposition of several seals if the oscillations require it, for example a first seal on the first cylindrical portion and a second seal on the second cylindrical portion of the plunger.

It is also feasible to provide means 68 comprising elements in a material with a high coefficient of friction distributed angularly on the periphery of the plunger or in the passage 18. These elements are for example overmolded with the piston typically made by molding.

It is also feasible to produce the means 68 with a sleeve in a material with a high coefficient of friction mounted on the plunger or in the passage 18.

Figure 5:
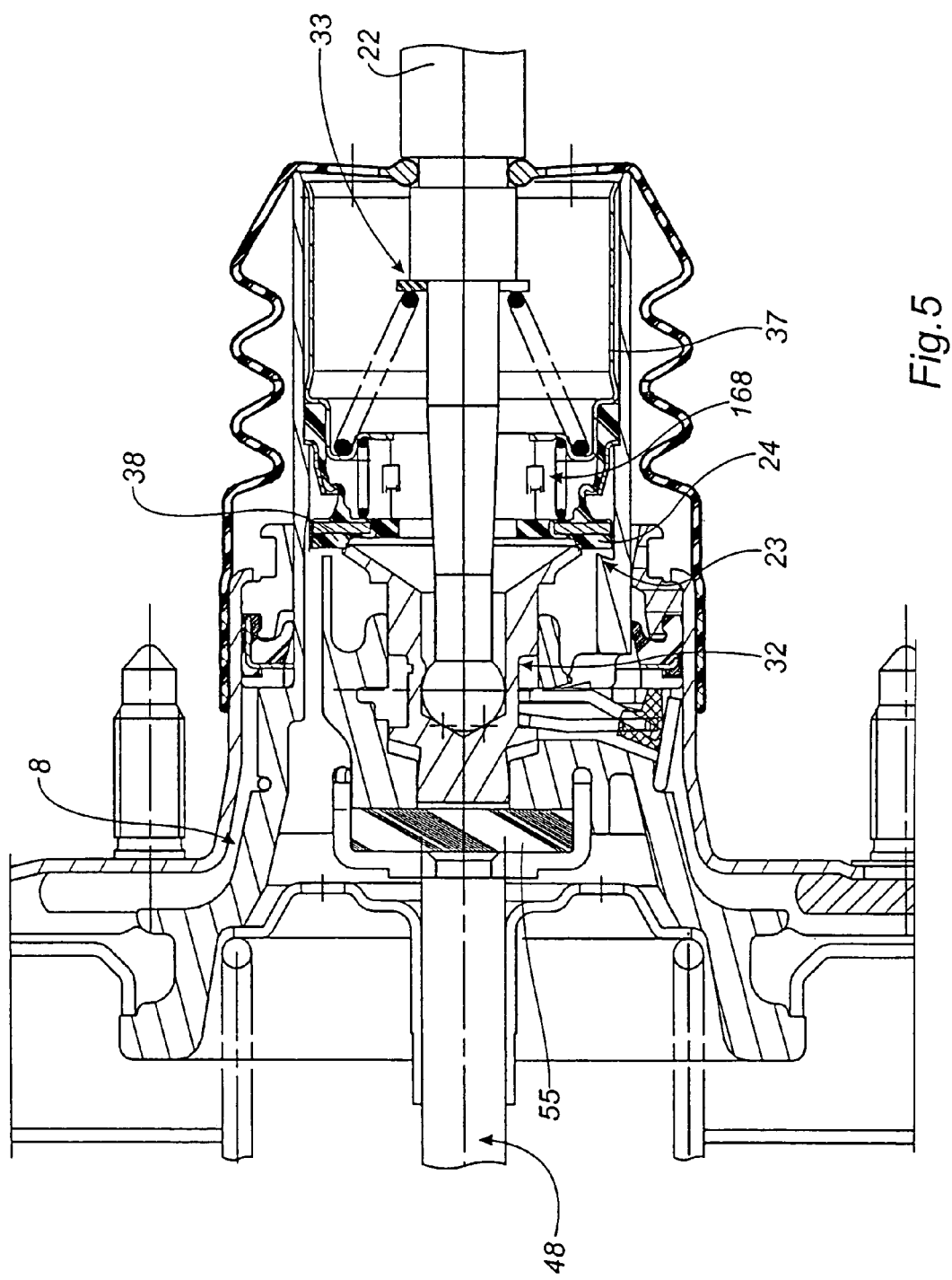
FIG. 5 is a view in longitudinal section of a detail of a first example of a second embodiment according to the present invention.

FIG. 5 shows a second embodiment of a booster according to the present invention comprising means 168 of damping the relative movement between the brake control 33 and the pneumatic piston 8.

The means 168 are attached to a rear face of the blanking plate 38 of the three-way valve 20 and to the stationary element 37 of the pneumatic piston 8.

The operation of the booster according to the present invention is as follows: after a movement of the brake control 33 toward the thrust rod 48, the pneumatic piston 8 is carried along by the pressure difference between the front chamber 10 and the rear chamber 12, the blanking plate 38 comes into contact with the first seat 26 and closes the equalizing valve 23 and moves away from the second seat 24 and opens the inlet valve 28. In certain particular cases, the pneumatic piston 8 moves in the first direction F1 at too great a speed, the blanking plate 38 remains in contact with the first seat 26 and keeps the equalizing valve 23 closed while the first seat 26 is axially behind the second seat 28. When the first seat 26 is axially in front of the second seat 28, the blanking plate 38 bears against the second seat 28 and moves away from the first seat 26. The movement of the blanking plate 38 is then determined by the position of the plunger 32 or of the brake control 33. Due to the presence of the means 168 between the blanking plate 38 and the piston 8, however, the movement of the piston 8 relative to the brake control 33 is damped in the direction F1 by means of the blanking plate 38. Then the piston 8 moves in the direction F2, the first seat 26 supported by the piston 8 again comes into contact with the blanking plate 38 and tends to want to push it back in the direction F2 and to open the inlet valve 24, the movement of the blanking plate 38 also being damped in the direction F2 by the means 168, and the oscillatory movement of the piston 8 relative to the brake control 33 is damped.

It is also feasible to produce the damping effect directly between the plunger and the blanking plate, that is to say to connect the plunger 22 and the blanking plate by damping means.

Figure 6:
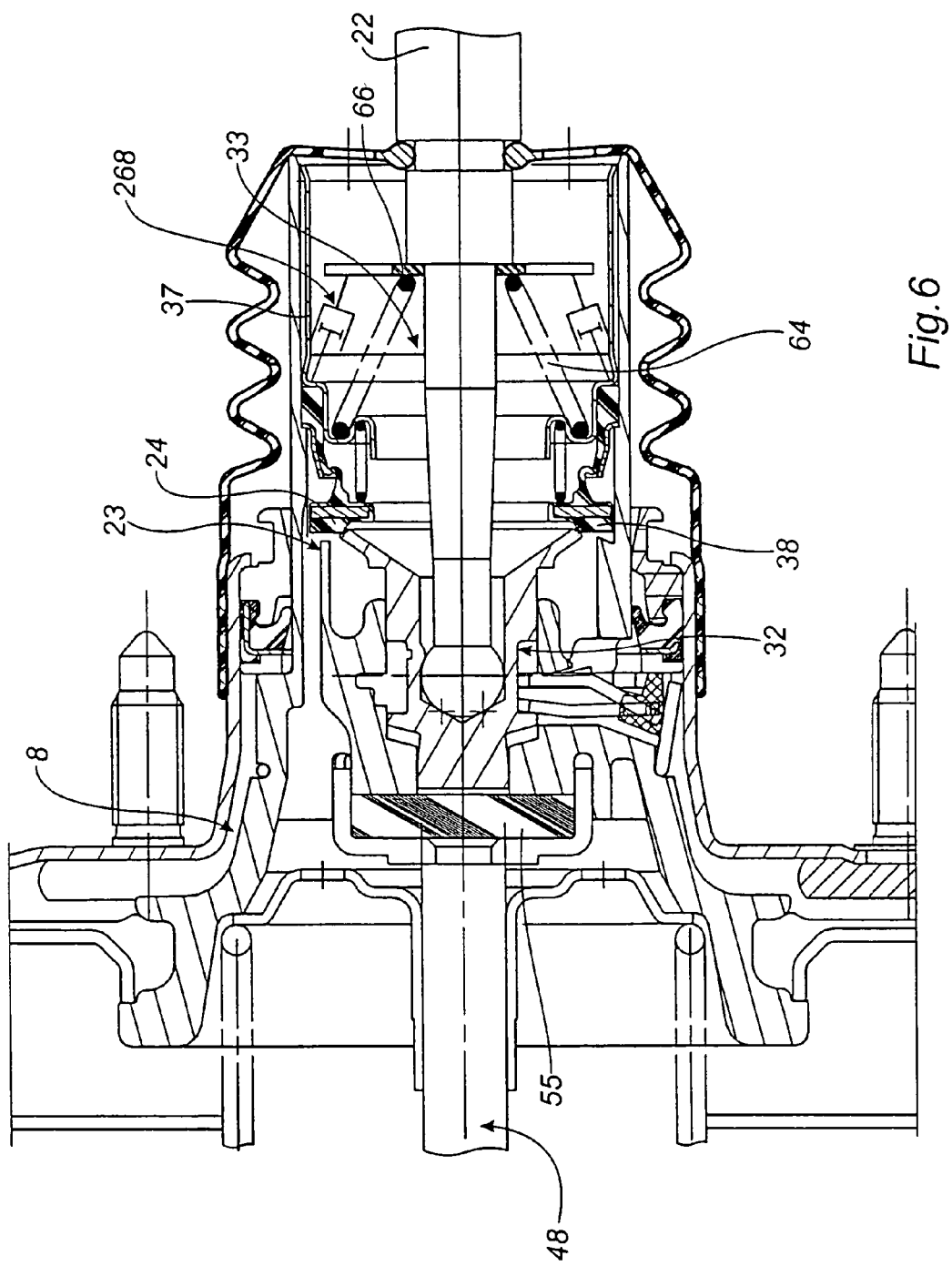
FIG. 6 is a view in longitudinal section of a detail of a second example of a second embodiment according to the present invention.

FIG. 6 shows a third embodiment of a booster according to the present invention in which the damping means 268 are placed on the pneumatic piston 8 and the control rod 22. In the example shown, the means 168 are attached by a first end to the stationary element of the pneumatic piston and the annular bearing surface 66 of the second return spring 64 of the control rod 22.

The operation of the three-way valve is substantially the same as in the second embodiment of the booster according to the present invention and as shown in FIG. 5, although the movement of the piston relative to the brake control is damped directly between the control rod 22 and the piston 8.

Figure 7:
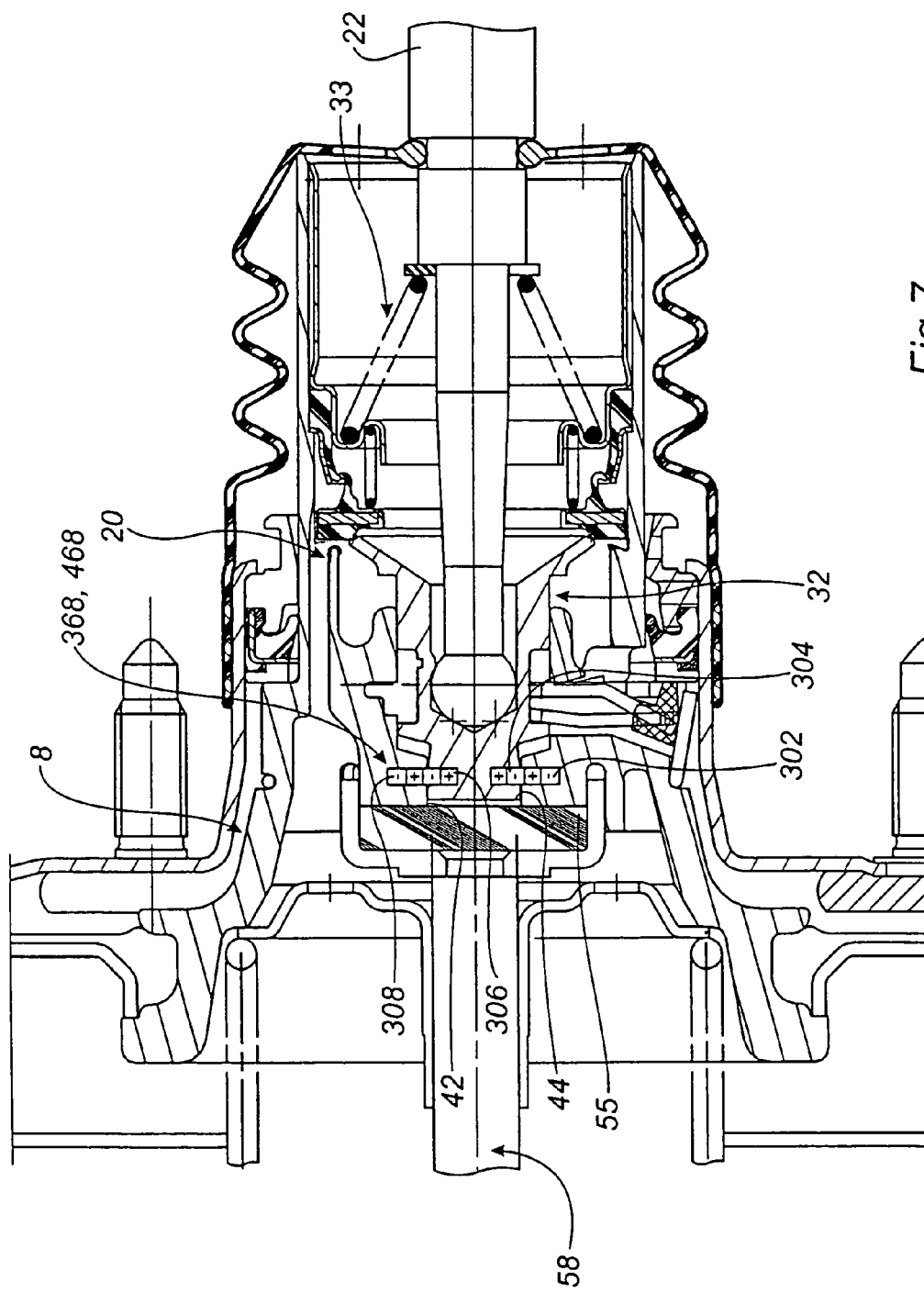
FIG. 7 is a view in longitudinal section of a fifth embodiment of a booster according to the present invention.

FIG. 7 shows a fourth embodiment according to the present invention in which the damping means 368, 468 are of the magnetic type.

In a first example, the plunger 32 comprises a first magnet 302 on the outer wall of the first cylindrical portion 44 and the pneumatic piston 8 comprises a second magnet 304 substantially opposite the first magnet 302 on the inner wall of the first cylindrical section 42 of the passage 18 of the piston, each of the first and second magnets 302, 304 being oriented such that facing poles of the first and second magnets are opposite so that the magnetic field that occurs works against the distancing of the plunger from the piston.

In particular, the first and second magnets 302, 304 are advantageously of annular shape and are mounted in first and second grooves 306, 308 made respectively in the first cylindrical portion 44 of the plunger 32 and in the cylindrical section 42 of the passage 18 of the piston 8. The annular shape of the magnets 302, 304 makes it possible to dispense with an angular orientation of the plunger 32 relative to the piston 8 at the time of installation. It is however well understood that first and second magnets could be distributed angularly on the surface of the plunger 32 and of the passage 18 of the piston 8.

The second magnet is advantageously overmolded in the pneumatic piston which is typically made by molding in plastic.

In this example, the magnets are of the permanent magnet, electric magnet or electromagnet type. In the latter cases, it is then advantageously possible to produce an active system to create a damping effect on the relative movement of the piston with respect to the plunger only in the phase likely to experience the "wiper noise".

Specifically, it is possible to modify the polarity of the electromagnet as a function of the pressure in the master cylinder. A computer generates an instruction to stop the power supply to one or other of the magnets beyond a certain hydraulic pressure in the master cylinder characterizing the fact that a reaction in the direction F2 is applied to the pneumatic piston and to the brake control via the rear face of the reaction disk, eliminating the parasitic relative movements between the piston and the brake control.

It is also feasible to set the power supply to the electromagnet as a function of the relative travel of the piston and the plunger.

It is well understood that provision can be made to use a permanent magnet and an electromagnet.

It is well understood that the electromagnetic means may be placed in any other position so that the pneumatic piston and the brake control can be coupled.

In a fifth embodiment, the piston and at least one element of the brake control are charged at least locally with electrostatic charges of opposite charges creating an attraction between the piston and the brake control. The regions charged electrostatically face each other or are at least able to overlap one another at least partially.

It is well understood that the damping means are not necessarily bidirectional and that it is feasible to provide damping only in the direction F1 or in the direction F2, which would nevertheless produce a notable reduction in "wiper noise".

It is equally well understood that damping means having a temporary effect only at the start of a braking phase do not depart from the scope of the present invention.

It is well understood that the booster according to the present invention may also comprise other means to avoid "wiper noise", for example a plunger comprising a sensor fitted with an axial protrusion intended to come into permanent contact with the rear face of the reaction disk and a reaction disk housing allowing a clearance between the front face of the reaction disk and the base of the housing in order to determine the jump.

This satisfactorily produces a simple pneumatic brake booster producing little or no "wiper noise".

The present invention applies principally to the brake industry for private vehicles.

What is claimed is:

1. A pneumatic brake booster comprising an envelope (2) of longitudinal axis (X), a first, low pressure, chamber (10), a second, variable pressure, chamber (12), a skirt (4) delimiting the first and second chambers (10, 12) and mounted sealed and slidable in the envelope (2), a pneumatic piston (8) rigidly attached to a central portion of the skirt (2), a three-way valve (20) mounted in a shank (14) of the pneumatic piston (8) and actuated by a brake control (33) comprising a control rod (22) of longitudinal axis (X) operated by a pedal at a first longitudinal end (25), a plunger (32) mounted in ball-joint fashion at a second longitudinal end (34) of the said control rod (22), the said three-way valve (20) comprising an equalizing valve (23) suitable for interconnecting the first and second chambers (10, 12) at rest and an inlet valve (24) suitable for allowing the second chamber (12) to be supplied with pneumatic fluid at high pressure, the equalizing valve (23) comprising a first seat (26) supported by the body (14) of the piston and a blanking element (36), the inlet valve (24) comprising a second seat (28) supported by a first longitudinal end of the plunger and the said blanking element (36), the plunger (32) comprises at a second longitudinal end, the opposite end to the first end (54), a surface facing a first face of a reaction disk (55) bearing via a second face on a first longitudinal end (50) of a thrust rod (48) suitable for transmitting a braking force applied to the brake control and the brake boosting effect to a master-cylinder, the pneumatic piston (8) also comprising in its central portion a surface (56) bearing against the first face of the reaction disk (55), characterized in that the said booster comprises means (68, 168, 268, 368, 468) allowing to damp the relative and in particular oscillatory movement between the brake control (33) and the pneumatic piston (8) when no hydraulic reaction exists, said means (66) to damp is a friction coupling between the plunger (32) of the brake control (33) and the pneumatic piston (8), said means (68) to damp comprise an annular groove (74) made in an inner wall of a second cylindrical section (60) of the passage (18) of the piston (8) and an element (72) in a material with a high coefficient of friction mounted in the said groove (74) and intended to come into contact with a second cylindrical portion (58) of the plunger close to the control rod.

2. The pneumatic brake booster according to claim 1, characterized in that the said damping means comprise an annular groove (170) made in an external wall of a first cylindrical portion (44) of the plunger (32) close to the control rod (22) and an element in a material (72) with a high coefficient of friction mounted in the said groove (70) and intended to come into contact with a first cylindrical section (42) of the passage (18) of the piston (8).

3. The pneumatic brake booster according to claim 1, characterized in that the said damping means comprise an annular groove (70) made in an outer wall of a second cylindrical portion (58) of the plunger close to the reaction disk (55) and an element (72) in a material with a high coefficient of friction mounted in the said groove (70) and intended to come into contact with a second cylindrical section (60) of the passage (18) of the piston (8).

4. The pneumatic brake booster according to claim 3, characterized in that the said element (72) is made of elastomer.

5. The pneumatic brake booster according to claim 4, characterized in that said element is an O-ring.

6. The pneumatic brake booster according to claim 5, characterized in that the friction forces between the piston (8) and the brake control lie advantageously between 5 Newtons and 40 newtons.

7. The pneumatic brake booster according to claim 6, characterized in that the friction forces between the piston (8) and the brake control lie more advantageously between 5 Newtons and 20 Newtons.

8. The pneumatic brake booster according to claim 7, characterized in that the friction forces between the piston (8) and the brake control lie yet more advantageously between 10 Newtons and 20 Newtons.

9. The pneumatic brake booster according to claim 1, characterized in that the said means (168) to damp connect via a first end a fixed element (37) of the piston and via a second end a rear face of the blanking element (32).

10. The pneumatic brake booster according to claim 1, characterized in that the said means (268) to damp connect via a first end a stationary element (37) of the piston (8) and via a second end the control rod (22).

11. The pneumatic brake booster according to claim 1, characterized in that the said means (368, 468) to damp are of the magnetic type.

12. The pneumatic brake booster according to claim 1, characterized in that a first magnet (302) and a second magnet (304) are mounted respectively on the brake control (33) and on the pneumatic piston (8) so that their opposite poles are facing each other or at least partially facing each other.

13. The pneumatic brake booster according to claim 12, characterized in that at least one of the said magnets (302, 304) is an electromagnet and in that provision is made to stop the power supply to the said electromagnet when the risks of disruptive oscillatory relative movements between the piston and the plunger have disappeared.

14. The pneumatic brake booster according to claim 1, characterized in that the said means (68, 168, 268, 368, 468) to damp is an electrostatic device.

15. The pneumatic brake booster according to claim 14, characterized in that the piston and the brake control are at least locally charged with opposite electrostatic charges.

16. A pneumatic brake booster comprising an envelope (2) of longitudinal axis (X), a first, low pressure, chamber (10), a second, variable pressure, chamber (12), a skirt (4) delimiting the first and second chambers (10, 12) and mounted sealed and slidable in the envelope (2), a pneumatic piston (8) rigidly attached to a central portion of the skirt (2) a three-way valve (20) mounted in a shank (14) of the pneumatic piston (8) and actuated by a brake control (33) comprising a control rod (22) of longitudinal axis (X) operated by a pedal at a first longitudinal end (25), a plunger (32) mounted in ball-joint fashion at a second longitudinal end (34) of the said control rod (22), the said three-way valve (20) comprising an equalizing valve (23) suitable for interconnecting the first and second chambers (10, 12) at rest and an inlet valve (24) suitable for allowing the second chamber (12) to be supplied with pneumatic fluid at high pressure, the equalizing valve (23) comprising a first seat (26) supported by the body (14) of the piston and a blanking element (36), the inlet valve (24) comprising a second seat (28) supported by a first longitudinal end of the plunger and the said blanking element (36), the plunger (32) comprises at a second longitudinal end, the Opposite end to the first end (54), a surface facing a first face of a reaction disk (55) bearing via a second face on a first longitudinal end (50) of a thrust rod (48) suitable for transmitting a braking force applied to the brake control and the brake boosting effect to a master-cylinder, the pneumatic piston (8) also comprising in its central portion a surface (56) bearing against the first face of the reaction disk (55), characterized in that the said booster comprises means (68, 168, 268, 368, 468) allowing to damp the relative and in particular oscillatory movement between the brake control (33) and the pneumatic piston (8) when no hydraulic reaction exists, said means (268) to damp connect via a first end a stationary element (37) of the piston (8) and via a second end the control rod (22).

17. A pneumatic brake booster comprising an envelope (2) of longitudinal axis (X), a first, low pressure, chanter (10), a second, variable pressure, chamber (12), a skirt (4) delimiting the first and second chambers (10, 12) and mounted sealed and slidable in the envelope (2), a pneumatic piston (8) rigidly attached to a central portion of the skirt (2), a three-way valve (20) mounted in a shank (14) of the pneumatic piston (8) and actuated by a brake control (33) comprising a control rod (22) of longitudinal axis (X) operated by a pedal at a first longitudinal end (25), a plunger (32) mounted in ball-joint fashion at a second longitudinal end (34) of the said control rod (22), the said three-way valve (20) comprising an equalizing valve (23) suitable for interconnecting the first and second chambers (10, 12) at rest and an inlet valve (24) suitable for allowing the second chamber (12) to be supplied with pneumatic fluid at high pressure, the equalizing valve (23) comprising a first seat (26) supported by the body (14) of the piston and a blanking element (36), the inlet valve (24) comprising a second seat (28) supported by a first longitudinal end of the plunger and the said blanking element (36), the plunger (32) comprises at a second longitudinal end, the Opposite end to the first end (54), a surface facing a first face of a reaction disk (55) bearing via a second face on a first longitudinal end (50) of a thrust rod (48) suitable for transmitting a braking force applied to the brake control and the brake boosting effect to a master-cylinder, the pneumatic piston (5) also comprising in its central portion a surface (56) bearing against the first face of the reaction disk (55), characterized in that the said booster comprises means (68, 168, 268, 368, 468) allowing to damp the relative and in particular oscillatory movement between the brake control (33) and the pneumatic piston (8) when no hydraulic reaction exists, said means (368,468) to damp are of the magnetic type.

18. The pneumatic brake booster according to claim 17, characterized in that a first magnet (302) and a second magnet (304) are mounted respectively on the brake control (33) and on the pneumatic piston (8) so that their opposite poles are facing each other or at least partially facing each other.

* * * * *